United States Patent [19]
Rao

[11] Patent Number: 5,566,246
[45] Date of Patent: Oct. 15, 1996

[54] SYSTEM AND METHOD FOR RANKING AND EXTRACTING SALIENT CONTOURS FOR TARGET RECOGNITION

[75] Inventor: Kashi Rao, Dallas, Tex.

[73] Assignee: Texas Instruments Incorporated, Dallas, Tex.

[21] Appl. No.: 483,351

[22] Filed: Jun. 7, 1995

Related U.S. Application Data

[60] Continuation of Ser. No. 923,398, Jul. 31, 1992, abandoned, which is a division of Ser. No. 676,650, Mar. 28, 1991, Pat. No. 5,210,799.

[51] Int. Cl.$^6$ ..................................................... G06K 9/00
[52] U.S. Cl. ........................................ 382/154; 382/199
[58] Field of Search ................................. 382/100, 154, 382/190, 195, 199, 282, 194; 356/16; 348/42, 46, 51, 47

[56] References Cited

U.S. PATENT DOCUMENTS

| | | | |
|---|---|---|---|
| 4,539,701 | 9/1985 | Galbreath | 382/1 |
| 4,573,191 | 2/1986 | Kidode et al. | 382/1 |
| 4,858,157 | 8/1989 | Murai et al. | 258/88 |

OTHER PUBLICATIONS

Sherman et al. "Stereo by Incremental Matching Contours", IEEE Pattern Analysis & Machine Intelligence, Nov. 1990, pp. 1102–1106.
Martelli, "An application of Heuristic Search Methods to Edge & Contour Detection", Communications of ACM, Feb. 1976, pp. 73–83.
Gonzalez, "Digital Image Processing", Addison–Wesley, pp. 416–423, 429–432.

*Primary Examiner*—Joseph Mancuso
*Attorney, Agent, or Firm*—W. Daniel Swayze, Jr.; Richard L. Donaldson; W. James Brady, III

[57] ABSTRACT

A system and method for obtaining salient contours from two-dimensional images acquired by a sensor is disclosed which process the two-dimensional images with an edge detector to produce edgels from each of the images, link the edgels into lists known as contours, compute a saliency value for each of the contours, rank the contours in decreasing order of saliency, and select certain ones of the ranked contours based on the requirements of a particular vision application.

Other devices, systems and methods are also disclosed.

11 Claims, 5 Drawing Sheets

5,566,246

SYSTEM AND METHOD FOR RANKING AND EXTRACTING SALIENT CONTOURS FOR TARGET RECOGNITION

This is a continuation of application Ser. No. 07/923,398 filed Jul. 31, 1992, abandoned; which is a divisional of application Ser. No. 07/676,650 filed Mar. 28, 1991, U.S. Pat. No. 5,210,799.

BACKGROUND OF THE INVENTION

1. Field of the Invention

This invention relates generally to pattern recognition, and more specifically to a system and method for ranking and extracting salient contours for improved target recognition.

2. Description of the Related Art

The central problem in machine vision and automatic target recognition (ATR) is to obtain robust descriptions from images. Robust descriptions help not only in object recognition, but also in motion matching, stereo matching, as well as in generally reducing image clutter. For object recognition, in particular, good descriptions increase the probability of recognition and reduce the probability of false alarms.

Edge detectors have been developed to attempt to obtain such robust descriptions. These detectors usually have thresholds to control which edges they find in the image. For example, the Canny edge detector has two thresholds controlling which edges are retained and which are thrown away. However, because the thresholds in the Canny edge detector are based on just the strengths of the edges, the resulting edges are not salient contours corresponding to object boundaries. On the other hand, desired object boundaries may not necessarily be strong but may have other important characteristics.

Other systems have been developed which employ total curvature as well as total curvature variation. Such systems obviously prefer circles and edges With substantial curvature. Additionally, such systems interatively converge to a solution and require a network to compute saliency.

A method recently developed extracts salient axes of symmetry called a skeleton sketch, although the method does not work with real images and does not find salient contours. Another method using indoor images (which have significantly less clutter and imperfection compared to outdoor images) employs a perceptual organization for grouping edges based on colinearity, parallelism, and co-termination. Such a method is not robust enough for outdoor images.

Other related research involves methods for intensity-based region segmentation. These techniques group image pixels into regions based on some similiarity measure. There are several problems with these methods, such as the fact they always yield closed boundaries. In complex, real outdoor images closed boundaries usually correspond to highlights, shadows, etc., but rarely correspond to object boundaries. Another problem is that the region boundaries are extremely sensitive to thresholds, (i.e., such boundaries change and move significantly as thresholds change). Yet another problem is that region segmentation is a global operation, meaning it is less sensitive and more likely to miss low contrast boundaries or small objects, particularly in complex images. For example, long, thin objects may be missed, although they may be salient.

Accordingly, improvements which overcome any or all of these problems are presently desirable.

SUMMARY OF THE INVENTION

In view of the above problems associated with the related art, it is an object of the present invention to provide a system and method for achieving robust and efficient object recognition, particularly from real outdoor images by reducing clutter and extracting salient information about objects in a complex image.

It is another object of the present invention to provide a system and method for ranking and extracting salient contours corresponding to possible objects from an image edge map or from a two-dimensional image acquired by a passive sensor.

These and other objects are accomplished in a preferred embodiment of the present invention by a system and method for obtaining salient contours from two-dimensional images acquired by a sensor which process the two-dimensional images with an edge detector to produce edgels from each of the images and link the edgels into lists known as contours. Each linked edgel (contour) is assigned a salient measure for each of length, smoothness, and contrast. The number of edgels in a contour is used for length, the average change of curvature is used for smoothness, and edge magnitude is used for contrast. A saliency value for each of the contours is computed based on the saliency measures for the respective contour, the contours are ranked in decreasing order of saliency, and certain ones of the ranked contours (which correspond to the object of interest) are selected based on the requirements of the particular vision application in which they will be used.

These and other features and advantages of the invention will be apparent to those skilled in the art from the following detailed description of a preferred embodiment, taken together with the accompanying drawings, in which:

BRIEF DESCRIPTION OF THE DRAWINGS

Corresponding numerals and symbols in the different figures refer to corresponding parts unless otherwise indicated.

DETAILED DESCRIPTION OF A PREFERRED EMBODIMENT

A contour is defined as a linked list of edge pixels. A salient contour, therefore, is one that is more significant than others in an image, wherein significance is established by the importance of certain characteristics of a contour for reliably finding objects of interest (referred to as targets) in the image. Salient contours are important for various applications such as object recognition and tracking of objects in moving images, discussed later.

Extracting salient contours decreases image clutter. Thus, there is more information about the target relative to the background, thereby making subsequent processing, especially object recognition and matching, more robust and efficient in time and memory. For this reason, a system and method for salient contour extraction according to the present invention is quite useful in a number of vision applications.

It is useful to first characterize salient contours in terms of their physical attributes and then describe preferred embodiments of the present invention.

A contour is considered salient if it is long, or smooth, or contrasts strongly with the surrounding region (this is an inclusive or). According to a preferred embodiment of the present invention, each one of these characteristics have been assigned a saliency measure. These saliency measures are then combined into one value for each contour.

A preferred embodiment of the salient contours extraction method according to the present invention has been implemented in Common Lisp on a Texas Instruments Explorer II. The time complexity is O(n), where n is the number of edgels in the image. It should be realized that the present invention should not be limited to any particular language or computing platform, as its performance is not particularly affected by any specific implementation selected. Note too, the systems and methods of the present invention can be easily implemented in parallel, because the saliency attributes (length, smoothness, and contrast) are independent of one another and independent from contour to contour.

Contours corresponding to three-dimensional phenomena like depth discontinuities and orientation discontinuities are preferred over those corresponding to two-dimensional phenomena like illumination changes in the world (e.g., shadows, surface, and reflectance markings). Since the input received from the sensor is two-dimensional, these preferences must be made from two-dimensional data.

Figure 1:
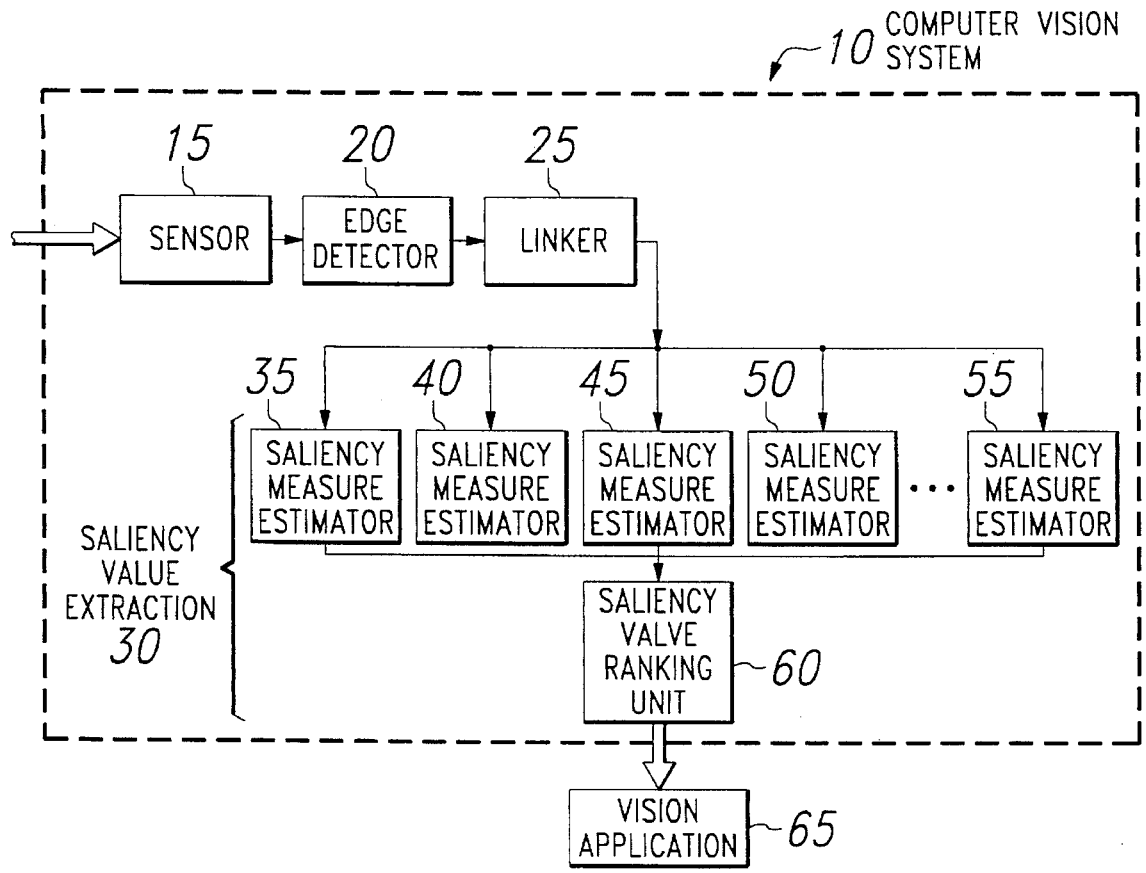
FIG. 1 is a block diagram of a vision system according to a preferred embodiment of the present invention.

Beginning with FIG. 1, which is a block diagram of a vision system 10 embodying the present invention, an image is sensed by sensor 15 which is preferably a passive sensor, although this is not required. Edge detector 20, such as a Canny edge detector (although other edge detectors could be used), receives the image from sensor 15 and passes over the image to detect edge pixels. Next, the edge pixels (also known as edgels) are output from edge detector 20 and are linked into lists of edgels called contours by linker 25. These contours are provided to saliency value extractor 30 which comprises saliency measure estimators 35, 40, 45, 50, 55 where a saliency measure for each desired characteristic for each contour is computed, and saliency value ranking unit 60 where all saliency measures for each contour are combined to obtain a saliency value for that contour. Within length saliency measure estimator 35, the length saliency measure, $S_1$, of a contour is given by $$S_1 = \frac{L - L_{min}}{L_{max} - L_{min}}$$

where L, the length of the contour, is defined as the number of edgels in that contour, $L_{min}$ is the length of the shortest contour, and $L_{max}$ is the length of the longest contour.

Within smoothness saliency measure estimator 40, the smoothness saliency measure, $S_3$, of a contour is given by $$S_s = 1 - \frac{\overline{\Delta \kappa} - \overline{\Delta \kappa_{min}}}{\overline{\Delta \kappa_{max}} - \overline{\Delta \kappa_{min}}} = \frac{\overline{\Delta \kappa_{max}} - \overline{\Delta \kappa}}{\overline{\Delta \kappa_{max}} - \overline{\Delta \kappa_{min}}}$$

where $\overline{\Delta \kappa}$ is the average change of curvature of the contour, $\overline{\Delta \kappa_{min}}$ is the smallest average change of curvature for all contours, and $\overline{\Delta \kappa_{max}}$ is the largest average change of curvature for all contours.

$\overline{\Delta \kappa}$ for a contour is computed in the following manner:
1. Compute curvature at each point in the contour, preferably using B-spline fitting.
2. Compute the change of curvature at each point by convolving the curvature values using the difference operator:

$$\boxed{-1 \quad 2 \quad -1}$$

3. Compute the average of the change of curvature.

Note that only the average change of curvature is used and not total curvature. For this reason, the present invention does not require circles and very curved lines as the prior art requires for good results. Also, the system and method of the present invention is non-iterative and therefore does not have the convergence problems associated with the prior art.

Within contrast saliency measure estimator 45, the contrast saliency measure, $S_c$, of a contour is given by $$S_c = \frac{\overline{C} - \overline{C_{min}}}{\overline{C_{max}} - \overline{C_{min}}}$$

where $\overline{C}$ is the average contrast of the contour, $\overline{C_{min}}$ is the smallest average contrast for all contours, and $\overline{C_{max}}$ is the largest average contrast for all contours.

The average contrast of a contour is the average of the strength of each edgel in the contour. The strength of each edgel is obtained from edge detector 20.

Although only three characteristics are discussed in connection with the particular embodiment of the present invention being discussed, it should be understood that, as shown in FIG. 1, there could be additional saliency characteristics (saliency measure estimators 50 and 55, for example) taken into account when extracting saliency measures from a contour.

The saliency measures for each characteristic for a particular contour is then received by saliency value ranking unit 60. The saliency value, S, of a contour is then computed as $$S = \frac{\omega_l S_l + \omega_s S_s + \omega_c S_c}{\omega_l + \omega_s + \omega_c}$$

where $\omega_l$ is the weight for the length saliency measure, $\omega_s$ is the weight for the smoothness saliency measure, and $\omega_c$ is the weight for the contrast saliency measure.

The weights for l, s, and c (and others if desired) are preselected based on the importance of the various measures; the higher the saliency measure, the more salient the contour. Although the weights for l, s, and c are arbitrary, it has been found that good results are obtained when ($\omega_l = \omega_s = \omega_c = \frac{1}{3}$. For the requirements of many computer vision applications, the three measures are given equal weights because one measure is normally not considered to be significantly more important than the others.

After a saliency value is computed for each contour in the image, the contours are also ranked in decreasing order of saliency by saliency value ranking unit 60. The most salient contours are then selected to be provided to vision application 65, which could be, for example, an object matching system.

Turning now to FIGS. 2a–e and 3a–e. FIGS. 2a–e involve an image of a flat bed truck obtained by a long wave forward-looking infra-red (FLIR) sensor, while FIGS. 3a–e relate to an image of a small communications van obtained in the visible spectrum by a TV sensor. Discussion about FIGS. 3a–e is identical to that which follows for FIGS. 2a–e.

Figure 2A:
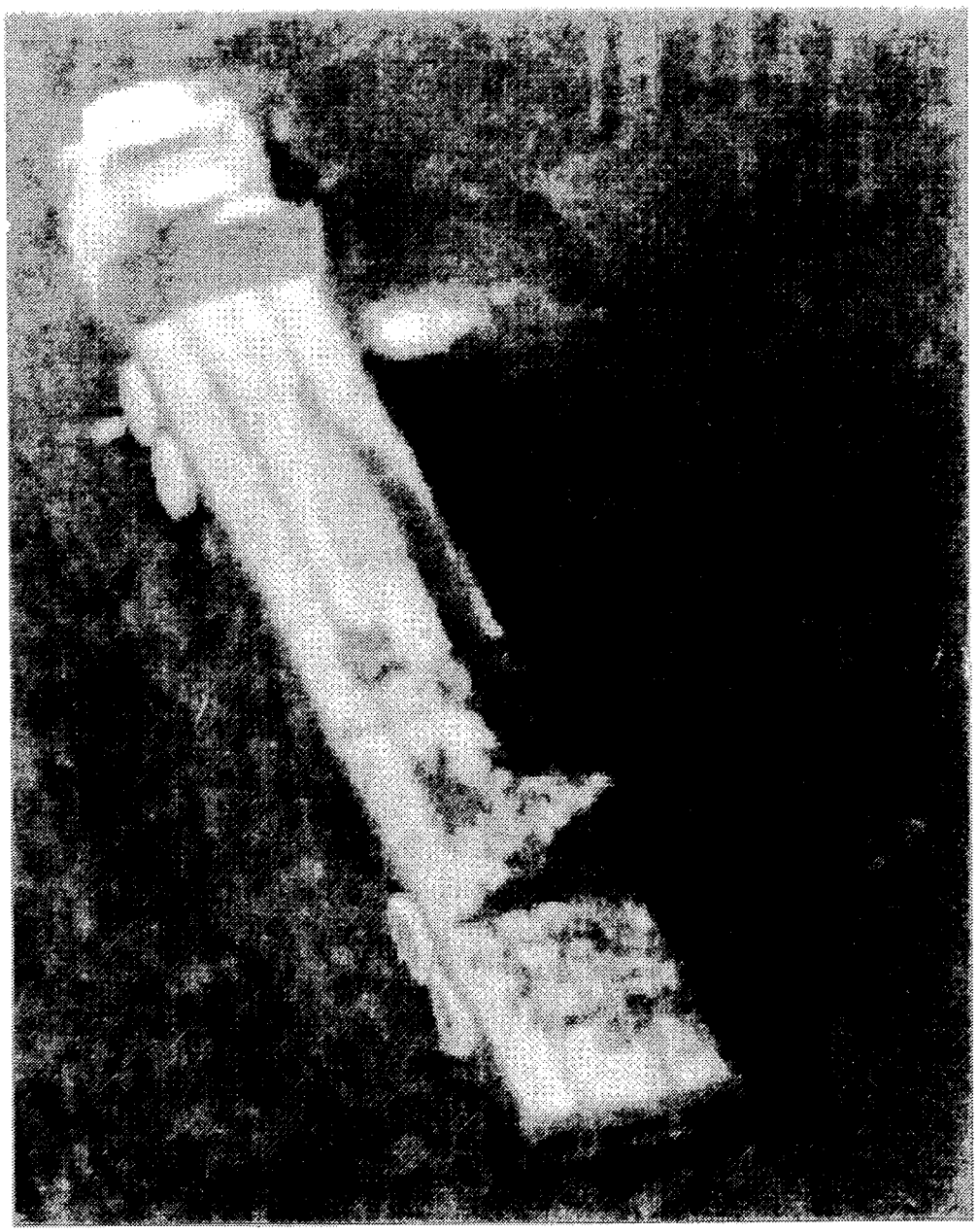
FIGS. 2a–e are pictorial descriptions and charts demonstrating how the present invention affects an image obtained by a long wave forward-looking infra-red (FLIR) sensor.
Figure 2B:
Figure 2C:
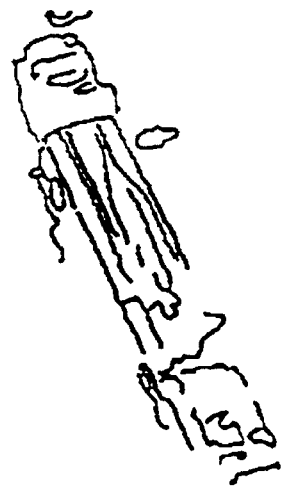

FIG. 2a shows the gray level images received from passive sensor 20. FIG. 2b shows the Canny edges (edgels) obtained at small thresholds of edge detector 20 to give a large number of edges. FIG. 2c shows the most salient contours obtained from saliency value extractor 30.

Figure 2D:
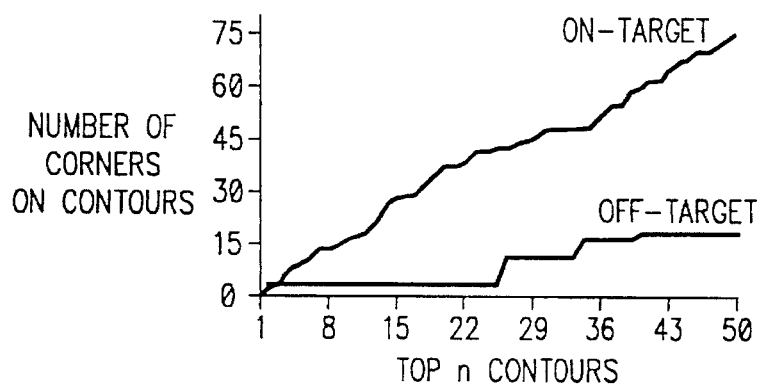
Figure 2E:
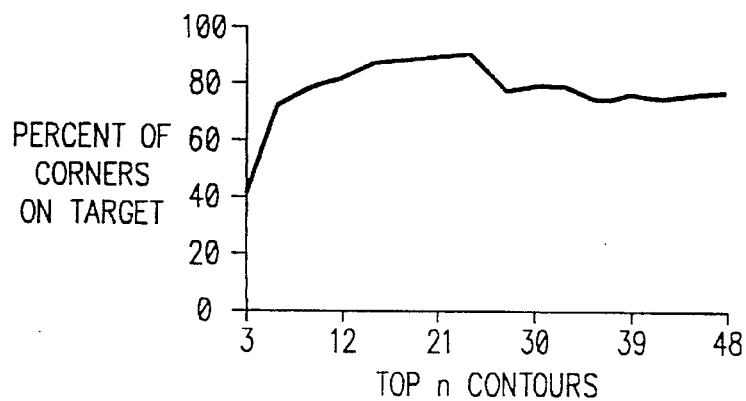

Since corners are used for object recognition according to a preferred embodiment of the present invention, the performance of the salient contours extraction system and method of the present invention can be evaluated in terms of corners on and off the objects to be recognized. FIG. 2d shows the cumulative number of on-target and off-target corners for the 50 most-salient contours. It can be seen that both the on-target and off-target curves are monotonically nondecreasing because they are cumulative curves. For better operation of vision application 65, it is preferable to have more on-target corners and less off-target corners in the top few contours. Therefore, especially in the most salient contours, it is desirable to have the on-target curve above the off-target curve, with a wide gap between the two curves. It is also desirable to have the intersection between the two curves be high on the vertical axis and far to the right. The curves shown in FIG. 2e depicts the ratio of the number of on-target corners to all image corners for the most salient contours. Studying the behavior of this ratio for the top few salient contours indicates the number of contours needed for vision applications such as object recognition. It is desirable for this curve to be high for the most salient contours and then drop for less salient ones.

Figure 3A:
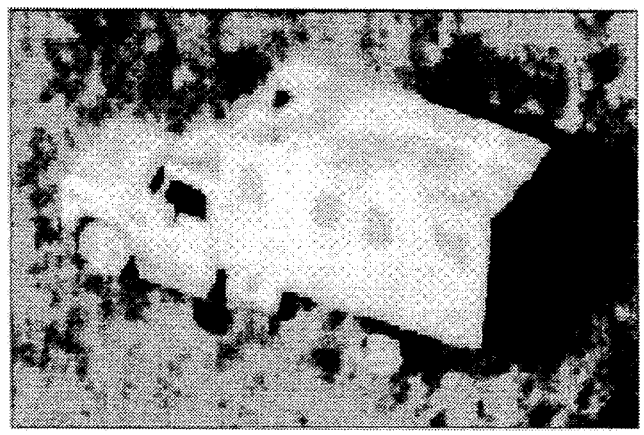
FIGS. 3a–e are pictorial descriptions and charts illustrating how the present invention affects an image obtained in the visible spectrum by a TV sensor.
Figure 3B:
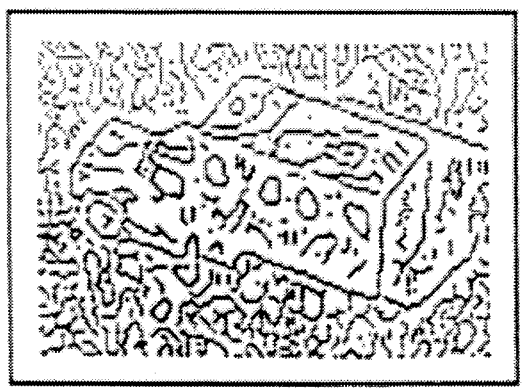
Figure 3C:
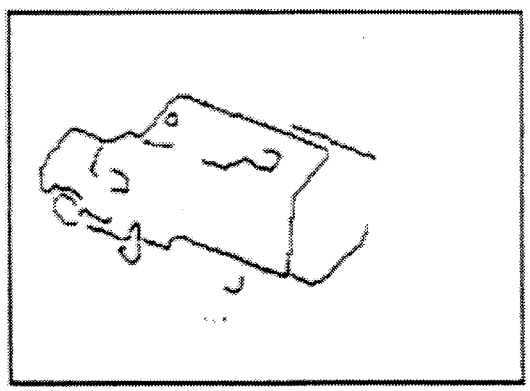
Figure 3D:
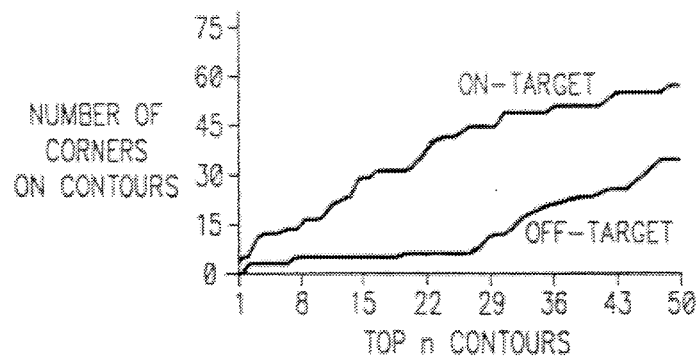
Figure 3E:
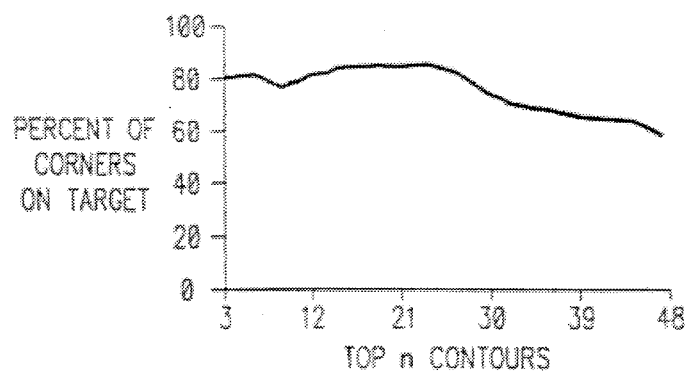
Figure 4:
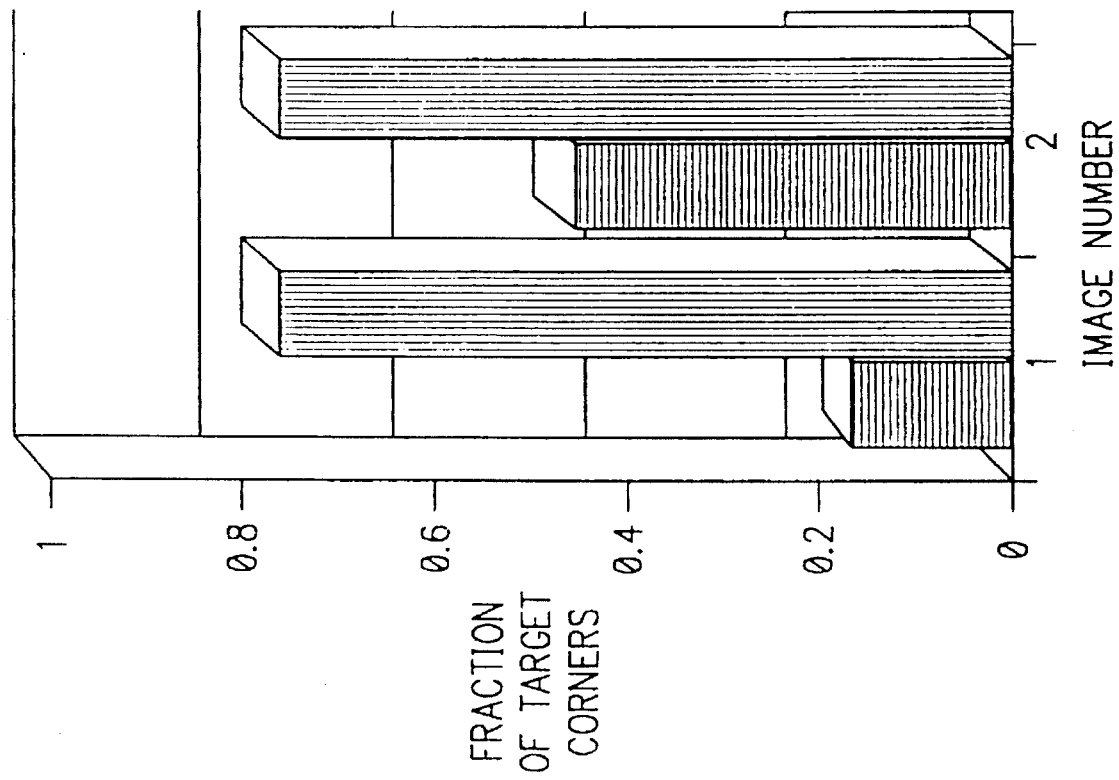
FIG. 4 is a bar chart for the gray level images of FIGS. 2a and 3a, showing the increase in fraction of target corners obtained achieved by employing the present invention.

The bar chart (FIG. 4), corresponding to the gray level images of FIGS. 2a and 3a, shows the increase in the fraction of target corners obtained when only the most salient contours extracted according to the present invention are used. The darker bars show the fraction of target corners ascertained without saliency value extractor 30, while the lighter bars reflect the fraction of target corners established by employing saliency value extractor 30.

As mentioned earlier, the present invention is useful for a number of computer vision tasks, including object recognition. By separating an object from the background within an image, salient contours extraction becomes an important precursor to object recognition. Furthermore, since the clutter has been removed to a large extent, an object recognition system can proceed faster and more efficiently (i.e., more robust recognition).

Returning to FIG. 1, according to a preferred embodiment of the present invention, an object recognition application of vision system 65 matches two-dimensional corners in an image, received from saliency value combination unit 60, with the vertices of a three-dimensional model using an alignment technique. Object recognition system 65 first extracts corners in the image provided by saliency value ranking unit 60. Then every triple of image corners is matched to every triple of three-dimensional model vertices to generate an alignment. The alignment is used to project the three-dimensional model to the two-dimensional image for verification. The salient contour extraction system and method of the present invention increases the ratio of image corners on the object to all image corners, thereby reducing the number of extraneous corners caused by image clutter, and resulting in a reduction of the search space (the combinations) in the corner matching stage of object recognition. Salient contours are also employed in a verification stage where only the salient image contours are used to verify the projected model contours.

Figure 5:
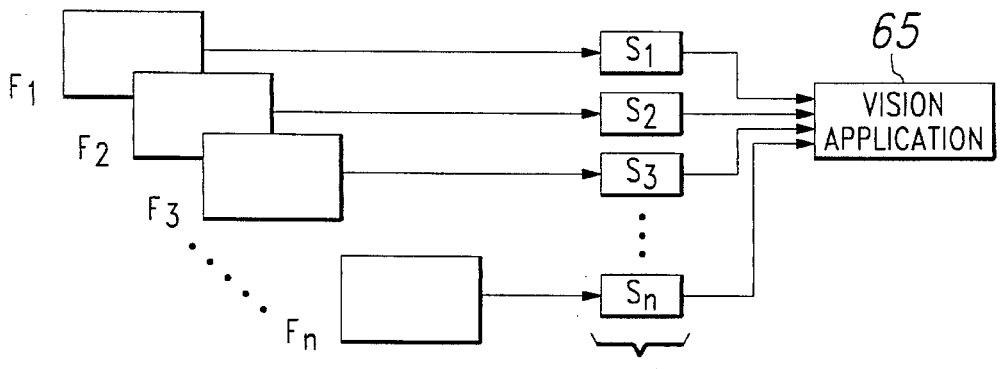
FIG. 5 illustrates an application of the present invention in a motion matching situation.
Figure 6:
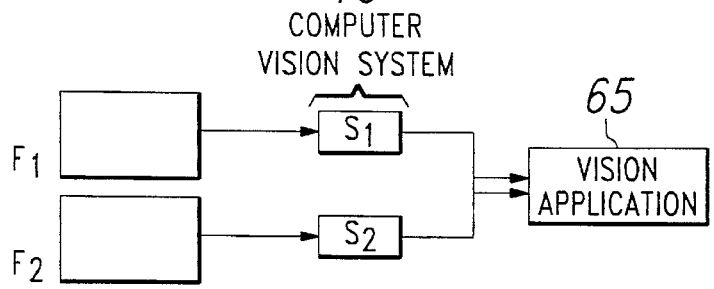
FIG. 6 illustrates an application of the present invention in a stereo matching situation.

Continuing now to FIGS. 5 and 6, it is apparent that the present invention can also be used in matching situations, such as motion and stereo. In motion matching situations (FIG. 5), important for tracking objects within images, a plurality of image frames $F_1, F_2, F_3, \ldots F_n$ from a motion sequence are provided to vision system 10 embodying the present invention. Vision system 10 extracts the most salient contours from frames $F_1, F_2, F_3, \ldots F_n$ and provides these contours to two dimensional matcher vision application 65. It should be noted that $S_1, S_2, S_3, \ldots S_n$ may comprise one vision system 10 or a plurality of vision systems 10 operating in parallel. Matcher 65 then matches these contours to estimate motion parameters. The use of extracted salient contours makes it considerably easier for matcher 65 to match edges in frames of a motion sequence. Matcher 65 may then yield two-dimensional or three-dimensional motion estimation based on inferencing after the matching operation, may determine structure of the object of interest from its motion, may operate as a moving target indicator, etc.

Looking now at FIG. 6, which illustrates an application of the present invention in a stereo matching situation, stereo image frames pair $F_1, F_2$ are provided to vision system 10 embodying the present invention. Vision system 10 extracts the most salient contours from frames $F_1, F_2$ and provides these contours to matcher vision application 65. Again, $S_1, S_2$ may comprise one vision system 10 or a plurality of vision systems 10 operating in parallel. Matcher 65 then matches these contours to estimate depth and other three-dimensional information about the scene, based on inferencing. As in the previous matching situation, extracting salient contours according to the present invention makes matching much easier since clutter in the image is significantly reduced.

As an aside, the results achieved by use of the present invention are fairly independent of the kind of two-dimensional sensor 15 used (e.g., TV, infra-red, etc.). Furthermore, the present invention operates primarily in a local context especially because an image may be occluded and/or there could be long, thin objects in the image.

It will be apparent to the skilled artisan that the present invention has numerous computer vision applications. Therefore, the present invention should not be limited to the computer vision applications discussed above, as these are provided for illustrative purposes only and not by way of limitation.

While a specific embodiment of the invention has been shown and described, various modifications and alternate embodiments will occur to those skilled in the art. Accordingly, it is intended that the invention be limited only in terms of the appended claims.

I claim:

1. A computer system for object matching in stereo comprising:

stereo structure for capturing and delivering a plurality of stereo image frames, each of said stereo image frames including a plurality of contours, each of said contours including edgels, said plurality of stereo image frames having associated therewith at least one three-dimensional parameter;

a vision system including a linker which links said edgels into said contours, said vision system connected to said stereo structure for receiving said plurality of stereo image frames from said stereo structure, and including a processing unit for determining a saliency for each of said contours and ranking said plurality of contours in order of saliency and extracting the most salient contours from said stereo image frames; and a matcher connected to said vision system such that said vision system provides said most salient contours to said matcher whereby said matcher matches said most salient contours to estimate at least one three-dimensional parameter of said plurality of stereo image frames.

2. The computer system of claim 1 wherein said vision system comprises a plurality of contour extractors operating in parallel.

3. The computer system of claim 1, wherein said processing unit comprises a computing unit for establishing a saliency value for each of said contours and determining a plurality of saliency measures for each saliency value.

4. The computer system of claim 3, wherein said computing unit determines said saliency value, S, as follows:

$$S = \frac{\omega_l S_l + \omega_s S_s + \omega_c S_c}{\omega_l + \omega_s + \omega_c}$$

where $W_1$ is the weight for the length saliency measure, $W_s$ is the weight for the smoothness saliency measure, and $W_c$ is the weight for the contrast saliency measure.

5. The computer system of claim 3, wherein at least one of said plurality of saliency measures determined by said computing unit includes a smoothness saliency measure, $S_s$, calculated as:

$$S_s = 1 - \frac{\overline{\Delta\kappa} - \overline{\Delta\kappa_{min}}}{\overline{\Delta\kappa_{max}} - \overline{\Delta\kappa_{min}}} = \frac{\overline{\Delta\kappa_{max}} - \overline{\Delta\kappa}}{\overline{\Delta\kappa_{max}} - \overline{\Delta\kappa_{min}}}$$

where $\Delta k$ is the average change of curvature of the contour, $\Delta k_{min}$ is the smallest average change of curvature for all contours, and $\Delta k_{max}$ is the largest average change of curvature for all contours.

6. The computer system of claim 5 wherein said average change of curvature, Dk, is calculated by computing curvature at each edgel within said contour, determining any change of curvature, and computing an average of said any change of curvature.

7. The computer system of claim 6, wherein said determining any change of curvature is accomplished by convolving said computed curvature for each edgel using a difference operator.

8. The computer system of claim 3, wherein at least one of said plurality of saliency measures determined by said computing unit includes a contrast saliency measure, $S_c$, calculated as:

$$S_c = \frac{\overline{C} - \overline{C_{min}}}{\overline{C_{max}} - \overline{C_{min}}}$$

where C is the average contrast of the contour, $C_{min}$ is the smallest average contrast for all contours, and $C_{max}$ is the largest average contrast for all contours.

9. The computer system of claim 3, wherein at least one of said plurality of saliency measures determined by said computing unit includes a length saliency measure, $S_l$, calculated as:

$$S_l = \frac{L - L_{min}}{L_{max} - L_{min}}$$

where L, the length of the contour, is defined as the number of edgels in that contour, $L_{min}$ is the length of the shortest contour, and $L_{max}$ is the length of the longest contour.

10. The computer system of claim 1 where said matcher comprises an object matching system connected to receive preselected ones of said processed contours and match them to known contours of predetermined objects.

11. A vision system for object matching in stereo comprising:

stereo structure for capturing and delivering a plurality of stereo image frames, each of said stereo image frames including a plurality of contours, each of said contours including edgels, said plurality of stereo image frames having associated therewith at least one three-dimensional parameter;

a vision system including a linker which links said edgels into said contours, said vision system connected to said stereo structure for receiving said plurality of stereo image frames from said stereo structure, and including a processing unit for determining a saliency for each of said contours and ranking said plurality of contours in order of saliency and extracting the most salient contours from said stereo image frames; and a matcher connected to said vision system such that said vision system provides said most salient contours to said matcher whereby said matcher matches said most salient contours to estimate at least one three-dimensional parameter of said plurality of stereo image frames.

* * * * *